US009711169B2

(12) United States Patent
Han et al.

(10) Patent No.: US 9,711,169 B2
(45) Date of Patent: Jul. 18, 2017

(54) SENSOR ARRAY FOR READING DATA FROM A STORAGE MEDIUM, STORAGE DEVICE AND METHOD OF READING DATA FROM A STORAGE MEDIUM

(71) Applicant: MARVELL INTERNATIONAL LTD., Hamilton (BM)

(72) Inventors: Guchang Han, Singapore (SG); Zhimin Yuan, Singapore (SG); Pantelis Sophoclis Alexopoulos, Singapore (SG)

(73) Assignee: Marvell International LTD., Hamilton (BM)

( * ) Notice: Subject to any disclaimer, the term of this patent is extended or adjusted under 35 U.S.C. 154(b) by 0 days.

(21) Appl. No.: 14/913,129

(22) PCT Filed: Aug. 26, 2014

(86) PCT No.: PCT/SG2014/000399
§ 371 (c)(1),
(2) Date: Feb. 19, 2016

(87) PCT Pub. No.: WO2015/030676
PCT Pub. Date: Mar. 5, 2015

(65) Prior Publication Data
US 2016/0203837 A1 Jul. 14, 2016

(30) Foreign Application Priority Data
Aug. 26, 2013 (SG) .................................. 201306448

(51) Int. Cl.
*G11B 5/39* (2006.01)
*G11B 5/29* (2006.01)
(Continued)

(52) U.S. Cl.
CPC ................ *G11B 5/29* (2013.01); *G11B 5/012* (2013.01); *G11B 5/3945* (2013.01);
(Continued)

(58) Field of Classification Search
CPC .......................... G11B 5/3945; G11B 5/3958
(Continued)

(56) References Cited

U.S. PATENT DOCUMENTS 6,717,780 B2 * 4/2004 Hiramoto ............... B82Y 10/00
257/E21.665
8,891,207 B1 * 11/2014 Li ........................... G11B 5/115
360/121

(Continued)

FOREIGN PATENT DOCUMENTS

EP 1587068 B1 10/2008

OTHER PUBLICATIONS

International Search Report regarding Application No. PCT/SG2014/000399, mailed Oct. 28, 2014.
(Continued)

*Primary Examiner* — Jefferson Evans

(57) ABSTRACT

According to embodiments of the present invention, a sensor array for reading data from a storage medium including a plurality of tracks is provided. The sensor array includes a first sensor, and a second sensor, wherein the first sensor and the second sensor are configured to obtain signals from adjacent tracks of the plurality of tracks of the storage medium, the signals being associated with data stored at the adjacent tracks. According to further embodiments of the present invention, a storage device and a method of reading data from a storage medium including a plurality of tracks are also provided.

8 Claims, 10 Drawing Sheets

(51) Int. Cl.
  *G11B 5/012* (2006.01)
  *G11B 5/48* (2006.01)
(52) U.S. Cl.
  CPC .......... *G11B 5/3958* (2013.01); *G11B 5/3977* (2013.01); *G11B 5/4886* (2013.01)
(58) Field of Classification Search
  USPC ........................................................ 360/316
  See application file for complete search history.

(56) References Cited

U.S. PATENT DOCUMENTS

| | | | | |
|---|---|---|---|---|
| 8,988,812 B1* | 3/2015 | Brunnett | ............ | G11B 5/3964 360/55 |
| 9,036,304 B1* | 5/2015 | Galbraith | ............ | G11B 5/4886 360/246.6 |
| 9,099,125 B1* | 8/2015 | Hattori | ................ | G11B 5/3912 |
| 9,218,822 B1* | 12/2015 | Contreras | .............. | G11B 5/486 |
| 2005/0036437 A1* | 2/2005 | Learned | ................ | G11B 5/012 369/124.02 |
| 2005/0248870 A1* | 11/2005 | Monk | .................... | G11B 15/05 360/64 |
| 2007/0242378 A1* | 10/2007 | Ikegami | ............... | G11B 5/0083 360/39 |
| 2013/0286502 A1* | 10/2013 | Erden | .................. | G11B 5/5552 360/76 |
| 2014/0139940 A1 | 5/2014 | Ong et al. | | |
| 2014/0160590 A1 | 6/2014 | Sankaranarayanan et al. | | |
| 2014/0177102 A1* | 6/2014 | Kief | ..................... | G11B 5/3163 360/128 |
| 2015/0077880 A1* | 3/2015 | Biskeborn | .......... | G11B 5/00826 360/84 |
| 2015/0098151 A1* | 4/2015 | Gadbois | .................. | G11B 5/29 360/234.5 |
| 2015/0206546 A1* | 7/2015 | Biskeborn | .......... | G11B 5/00817 360/48 |

OTHER PUBLICATIONS

Written Opinion regarding Application No. PCT/SG2014/000399, mailed Oct. 28, 2014.

* cited by examiner

SENSOR ARRAY FOR READING DATA FROM A STORAGE MEDIUM, STORAGE DEVICE AND METHOD OF READING DATA FROM A STORAGE MEDIUM

CROSS REFERENCE TO RELATED APPLICATIONS

This application is a U.S. National Phase Application under 35 U.S.C. 371of International Application No. PCT/SG2014/000399, filed 26 Aug. 2014 and published in English as WO 2015/030676 A1 on 5 Mar. 2015, which claims benefit of and priority to Singapore patent application No. 201306448-0, filed 26 Aug. 2013, the contents of both of the above applications are hereby incorporated by reference in their entirety for all purposes.

TECHNICAL FIELD

Various embodiments relate to a sensor array for reading data from a storage medium including a plurality of tracks, a storage device, and a method of reading data from a storage medium including a plurality of tracks.

BACKGROUND

FIG. 1A shows a perspective view of a hard disk drive 100. The hard disk drive 100 includes a data storage medium 180 and an actuating arm 182 which may be movable over the top surface of the storage medium 180. The actuating arm 182 includes a slider 184 arranged towards the tip region of the actuating arm 182. The slider 184 includes a head (e.g. a read/write head, or R/W head) 186 which may include a reader (or read head) and a writer (or write head). The actuating arm 182 may be controlled to position the head 186 over a track (e.g. data track) of the data storage medium 180 to read data from the data storage medium 180 by means of the reader or to write data to the data storage medium 180 by means of the writer.

State of the art head technology, as shown in FIG. 1B, uses a single sensor 191 as the read head, as part of a R/W head (e.g. 186) to read back data stored in a medium (e.g. 180). The read head (R1) 191 may be arranged between a pair of hard bias magnets 192a, 192b. The read head 191 and the hard bias (HB) magnets 192a, 192b may be arranged between a pair of main shield elements: main shield 1 193a, and main shield 2 193b. The arrows indicating "down track direction" and the "cross track direction" represent the arrangement of the read head 191 relative to the tracks of the medium. The parameter "V" shown in FIG. 1B represents the voltage measured between the two shields (main shield 1 193a and main shield 2 193b) connecting the sensor (R1) 191.

FIG. 1C shows a schematic top view of the prior art read head 191 of FIG. 1B relative to tracks of a data storage medium, illustrating a conventional reading scheme with a single giant magnetoresistance (GMR) or tunnel magnetoresistance (TMR) sensor to show an offset effect. For illustration purposes, four adjacent tracks 195a (Track 1; T1), 195b (Track 2; T2), 195c, 195d of the data storage medium are shown in FIG. 1C.

An essential requirement of the read sensor 191 is that its width, RW, should be smaller than the track width, TW, to avoid reading signal from adjacent tracks (e.g. 195a, 195b). Typically, the physical width, RW, of the sensor 191 must be about 50-70% of the track width, TW. Generally, the sensor, as indicated by 191a, should be located exactly at the center of the track (e.g. Track 1 195a) to reduce the read error. Any offset of the sensor will induce the loss of signal to noise ratio (SNR). As shown in FIG. 1C, when the sensor, as indicated by 191b, is offset towards Track 2 195b, the sensor 191b will also read signal from the Track 2 195b. The output or total voltage from the reader 191, being the reading signal, will be Vs=Va+Vb=aT1+bT2, where Va and Vb are related to the sensor response to Track 1 195a and Track 2 195b, respectively. The parameter Vs may be equivalent to the parameter "V" as described above in relation to FIG. 1B. The SNR is equivalent to (aT1/bT2) and will be reduced as 20 log (aT1/bT2). The state of the art servo system controls the offset so as to minimize bT2.

Therefore, the focus has been on the avoidance of reading from adjacent tracks. One option is to scale down the read width (RW), to be less than the track width (TW), i.e. RW<<TW. Another option is to reduce the inter-track interference (ITI) by servo control.

However, as the track width shrinks to accommodate the storage density increment, the sensor width or read width must decrease accordingly. As a result, read sensor widths are being pushed below the 20 nm scale. The sensor width is currently defined by lithography (e.g. deep ultraviolet (DUV), electron beam (e-beam), etc.) and etching (argon (Ar) ion milling, reactive ion beam etching, etc.) processes. As the data storage industry is passing semiconductor industry in the minimum feature size required for read sensors, it is becoming more and more difficult to shrink the sensor widths. Therefore, for the fabrication process, the critical dimension (CD) may be less than that available in the semiconductor industry. Also, a small read width may result in instability.

Further, while the track width in the recording media can be significantly reduced through shingled writing or two dimensional recording technique, the read track resolution is mainly limited by the sensor width.

SUMMARY

According to an embodiment, a sensor array for reading data from a storage medium comprising a plurality of tracks is provided. The sensor array may include a first sensor, and a second sensor, wherein the first sensor and the second sensor are configured to obtain signals from adjacent tracks of the plurality of tracks of the storage medium, the signals being associated with data stored at the adjacent tracks.

According to an embodiment, a storage device is provided. The storage device may include a storage medium including a plurality of tracks, and a sensor array including a first sensor, and a second sensor, wherein the first sensor and the second sensor are configured to obtain signals from adjacent tracks of the plurality of tracks of the storage medium, the signals being associated with data stored at the adjacent tracks.

According to an embodiment, a method of reading data from a storage medium including a plurality of tracks is provided. The method may include arranging a first sensor and a second sensor of a sensor array over adjacent tracks of the plurality of tracks of the storage medium, obtaining signals from the adjacent tracks with the first sensor and the second sensor, and determining data stored in a track of the adjacent tracks based on the signals obtained.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1B shows a schematic top view of a prior art read sensor, while

DETAILED DESCRIPTION

Figure 1A:
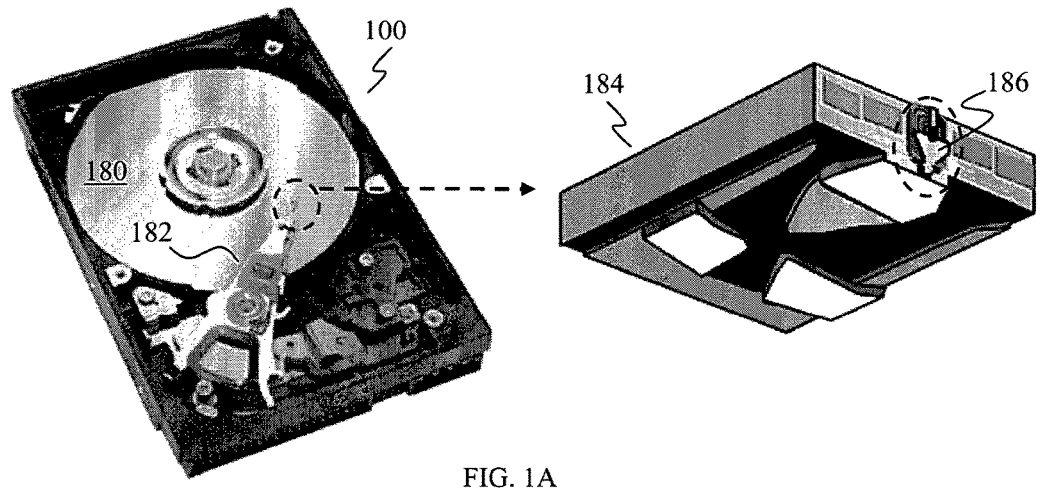
FIG. 1A shows a perspective view of a hard disk drive.
Figure 1B:
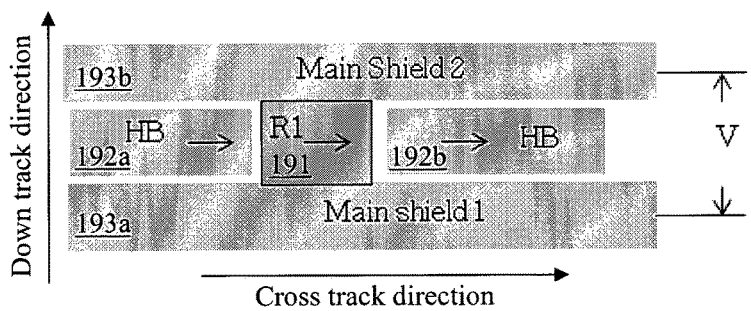
Figure 1C:
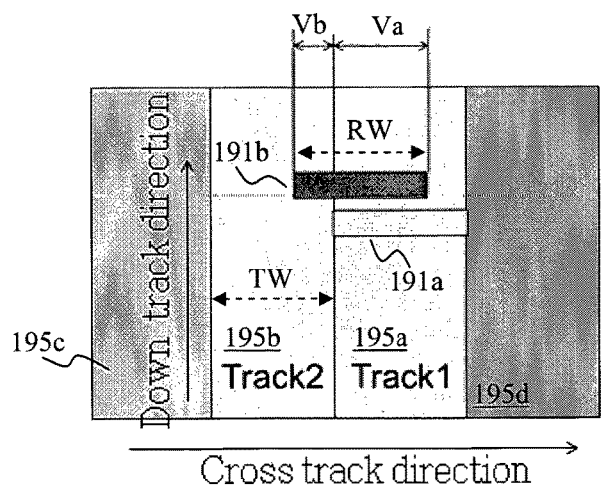
FIG. 1C shows a schematic top view of the prior art read head of FIG. 1B relative to tracks of a data storage medium.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may relate to a magnetic field sensing device, for example a sensor array for reading at least two adjacent tracks in parallel. For example, the sensor array may read data from at least two adjacent tracks of a data storage medium (e.g. a disk or storage medium, e.g. in a hard disk drive (HDD)) in parallel or simultaneously.

Various embodiments may provide sensor arrays or reader arrays for ultrahigh track density and two-dimensional magnetic recording (TDMR).

Various embodiments may address or overcome the read track resolution issue of prior art read sensors where the read track resolution is limited by the sensor width.

In various embodiments, in order to relax the scaling down of the sensor width for ultrahigh track resolution, a sensor array which may allow a sensor width larger than the track width may be provided. The sensor array may include at least two sensors. In various embodiments, the sensor array may be used to read data on two adjacent tracks in parallel. As a result, the reading speed may be much improved. The output of each sensor in the sensor array may be composed of data information from two adjacent tracks (e.g. adjacent data tracks). Using simple data processing, the readback signal containing only one track data information (e.g. data from a single track) may be recovered with high SNR. Further, various embodiments of the sensor array may be provided, where the sensor array may avoid reading data information outside of the targeted or intended tracks at larger skew angles.

Figure 2A:
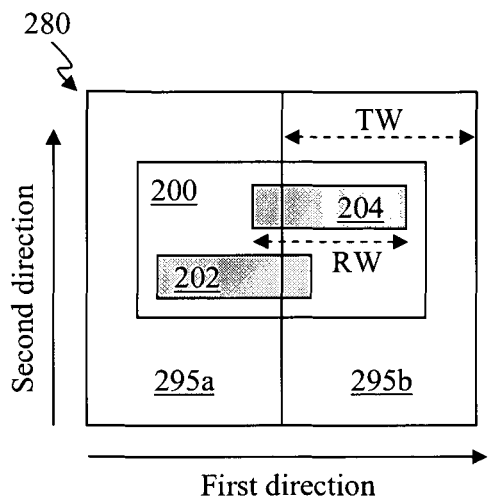
FIG. 2A shows a schematic cross-sectional view of a sensor array for reading data from a storage medium, according to various embodiments.

FIG. 2A shows a schematic cross-sectional view of a sensor array 200 for reading data from a storage medium, according to various embodiments, where the storage medium includes a plurality of tracks. The sensor array 200 includes a first sensor 202, and a second sensor 204, wherein the first sensor 202 and the second sensor 204 are configured to obtain signals from adjacent tracks 295a, 295b of the plurality of tracks of the storage medium 280, the signals being associated with data stored at the adjacent tracks 295a, 295b. In various embodiments, the signals obtained by the first sensor 202 and the second sensor 204 may include data information corresponding to the adjacent tracks 295a, 295*b*. For illustration purposes, only two tracks of the plurality of tracks of the storage medium 280 are shown in FIG. 2A.

In various embodiments, the first sensor 202 and the second sensor 204 may be configured to obtain the signals from adjacent tracks 295*a*, 295*b* of the plurality of tracks of the storage medium 280 in parallel or at least substantially simultaneously.

In various embodiments, the first sensor 202 and the second sensor 204 may be arranged adjacent or side by side to each other.

In various embodiments, the adjacent tracks 295*a*, 295*b* may be the desired or target tracks where data are to be read from.

In various embodiments, the adjacent tracks 295*a*, 295*b* may be two adjacent tracks. However, it should be appreciated that the term "adjacent tracks" may also refer to three adjacent tracks, for example.

In the context of various embodiments, the first sensor 202 may be configured to obtain a first signal of the signals from the adjacent tracks 295*a*, 295*b*, and the second sensor 204 may be configured to obtain a second signal of the signals from the adjacent tracks 295*a*, 295*b*.

In various embodiments, the first sensor 202 and the second sensor 204 may partially overlap each other along a first direction. This may mean that the first sensor 202 and the second sensor 204 may be arranged offset relative to each other along the first direction.

In various embodiments, the first sensor 202 and the second sensor 204 may be arranged spaced apart from each other along a second direction. The sensor array 200 may further include an intermediate shield layer arranged in between the first sensor 202 and the second sensor 204. The intermediate shield layer may be arranged in contact with the first sensor 202 and the second sensor 204. In various embodiments, the thickness of the intermediate shield layer may define the spacing between the first sensor 202 and the second sensor 204. As non-limiting examples, the intermediate shield layer may have a thickness of between about 10 nm and about 100 nm, e.g. between about 10 nm and about 50 nm, between about 50 nm and about 100 nm, or between about 30 nm and about 70 nm. The intermediate shield layer may include a soft magnetic material, for example nickel-iron (NiFe).

In various embodiments, the first sensor 202 and the second sensor 204 may be arranged coaxially along an axis defined along the second direction.

In the context of various embodiments, the first and second directions may be directions which may be at least substantially perpendicular to each other. The first direction may be defined along a cross track direction, relative to the tracks (e.g. adjacent desired tracks 295*a*, 295*b*) of the storage medium 280. The second direction may be defined along a down track direction, relative to the tracks (e.g. adjacent desired tracks 295*a*, 295*b*) of the storage medium 280.

In the context of various embodiments, at least one of the first sensor 202 or the second sensor 204 may be dimensioned to have a width that is less than a width of one track of the adjacent tracks 295*a*, 295*b*. This may mean that at least one of the first sensor 202 or the second sensor 204 may have a sensor width (RW) that is smaller than a track width (TW).

In the context of various embodiments, at least one of the first sensor 202 or the second sensor 204 may be dimensioned to have a width that is larger than a width of one track of the adjacent tracks 295*a*, 295*b*. This may mean that at least one of the first sensor 202 or the second sensor 204 may have a sensor width (RW) that is larger than a track width (TW).

In the context of various embodiments, at least one of the first sensor 202 or the second sensor 204 may be dimensioned to have a width that ranges from less than a width of one track of the adjacent tracks 295*a*, 295*b* to less than a total width of the adjacent tracks 295*a*, 295*b*. In a non-limiting example based on two adjacent tracks 295*a*, 295*b*, the sensor width (RW) of at least one of the first sensor 202 or the second sensor 204 may be between less than one track width (e.g. 50-70% of one track width) and less than two track widths (e.g. 150% of the track width).

In the context of various embodiments, each of the first sensor 202 and the second sensor 204 may be arranged in between a respective pair of magnets (hard bias magnets) along the first direction.

In various embodiments, the sensor array 200 may further include a third sensor, wherein the first sensor 202, the second sensor 204 and the third sensor may be configured to obtain the signals from the adjacent tracks (e.g. two adjacent tracks 295*a*, 295*b* or three adjacent tracks). The first sensor 202, the second sensor 204 and the third sensor may be arranged adjacent or side by side to each other.

In various embodiments, the first sensor 202, the second sensor 204 and the third sensor may be configured to obtain the signals in parallel or at least substantially simultaneously.

In various embodiments, the first sensor 202, the second sensor 204 and the third sensor may be configured to obtain the signals from two adjacent tracks 295*a*, 295*b* in parallel or at least substantially simultaneously.

In the context of various embodiments, the first sensor 202 may be configured to obtain a first signal of the signals from the adjacent tracks (e.g. 295*a*, 295*b*), the second sensor 204 may be configured to obtain a second signal of the signals from the adjacent tracks (e.g. 295*a*, 295*b*), and the third sensor may be configured to obtain a third signal of the signals from the adjacent tracks (e.g. 295*a*, 295*b*).

In various embodiments, the first sensor 202, the second sensor 204 and the third sensor may be arranged coaxially along a second direction.

In various embodiments, the second sensor 204 may be arranged in between the first sensor 202 and the third sensor along a second direction, and wherein the second sensor 204 may partially overlap each of the first sensor 202 and the third sensor along a first direction. This may mean that the second sensor 204 may be arranged offset relative to each of the first sensor 202 and the third sensor each other along the first direction.

In various embodiments, the first sensor 202 and the third sensor may completely overlap each other along the first direction. This may mean that the respective central axes of the first sensor 202 and the third sensor defined along the second direction may be aligned to each other and the respective widths of the first sensor 202 and the third sensor may be at least substantially similar or identical.

In various embodiments, each of the first sensor 202 and the third sensor may be configured to obtain signals from two same tracks of the adjacent tracks. This may mean that the first sensor 202 and the third sensor may read the same tracks.

In various embodiments, the first sensor 202 or the third sensor may be deactivated.

In various embodiments, each of the first sensor 202, the second sensor 204 and the third sensor may be arranged spaced apart from each other along a second direction.

In various embodiments, the first sensor 202, the second sensor 204 and the third sensor may be arranged coaxially along an axis defined along the second direction.

In various embodiments, the sensor array 200 may further include a first intermediate shield layer arranged in between the first sensor 202 and the second sensor 204. The first intermediate shield layer may be arranged in contact with the first sensor 202 and the second sensor 204. The thickness of the first intermediate shield layer may define the spacing between the first sensor 202 and the second sensor 204.

In various embodiments, the sensor array 200 may further include a second intermediate shield layer arranged in between the second sensor 204 and the third sensor. The second intermediate shield layer may be arranged in contact with the second sensor 204 and the third sensor. The thickness of the second intermediate shield layer may define the spacing between the second sensor 204 and the third sensor.

In various embodiments, at least one of the first intermediate shield layer or the second intermediate shield layer may have a thickness of between about 10 nm and about 100 nm, e.g. between about 10 nm and about 50 nm, between about 50 nm and about 100 nm, or between about 30 nm and about 70 nm.

In various embodiments, at least one of the first intermediate shield layer or the second intermediate shield layer may include a soft magnetic material, for example nickel-iron (NiFe).

In the context of various embodiments, each of the first sensor 202, the second sensor 204 and the third sensor may be arranged in between a respective pair of magnets (hard bias magnets) along the first direction.

In various embodiments, the first sensor 202, the second sensor 204 and the third sensor may be configured to obtain the signals from three adjacent tracks, e.g. the signals may be obtained in parallel or at least substantially simultaneously.

In various embodiments, the third sensor may be configured to obtain one signal (out of the signals) from the three adjacent tracks.

In various embodiments, the first sensor 202 and the third sensor may be configured to obtain signals from two adjacent tracks of the adjacent tracks in parallel or at least substantially simultaneously, and the second sensor and the third sensor may be configured to obtain signals from two other adjacent tracks of the adjacent tracks in parallel or at least substantially simultaneously. One track of the two adjacent tracks and the two other adjacent tracks of the adjacent tracks may be a common track.

In various embodiments, the first sensor 202 and the third sensor may be arranged coaxially along a first direction, and wherein the second sensor 204 may partially overlap each of the first sensor 202 and the third sensor along a second direction. This may mean that the second sensor 204 may be arranged offset relative to each of the first sensor 202 and the third sensor each other along the first direction.

In various embodiments, the first sensor 202 and the third sensor may be arranged to completely overlap each other along the second direction. This may mean that the respective central axes of the first sensor 202 and the third sensor defined along the first direction may be aligned to each other.

In various embodiments, the first sensor 202 and the third sensor may be arranged at least substantially symmetrical about the second sensor 204, or about an axis defined along the second direction.

In various embodiments, each of the first sensor 202 and the third sensor may be arranged spaced apart from the second sensor 204 along a second direction.

In various embodiments, the sensor array 200 may further include an intermediate shield layer arranged in between the first 202 and third sensors and the second sensor 204. The intermediate shield layer may be arranged in contact with the first sensor 202, the second sensor 204 and the third sensor. The thickness of the intermediate shield layer may define the spacing between the first 202 and third sensors and the second sensor 204. As non-limiting examples, the intermediate shield layer may have a thickness of between about 10 nm and about 100 nm, e.g. between about 10 nm and about 50 nm, between about 50 nm and about 100 nm, or between about 30 nm and about 70 nm. The intermediate shield layer may include a soft magnetic material, for example nickel-iron (NiFe).

In various embodiments, each of the first sensor 202 and the third sensor may be arranged spaced apart from each other along a first direction.

In various embodiments, the sensor array 200 may further include an insulating structure in between the first sensor 202 and the third sensor. The insulating structure may have a gap length, g, of at least 10 nm and up to one track width or less. The insulating structure and the second sensor 204 may be arranged coaxially along an axis defined along the second direction. The respective central axes of the insulating structure and the second sensor 204 defined along the second direction may be aligned to each other. In various embodiments, the insulating structure may include an insulating material, e.g. aluminum oxide ($Al_2O_3$) or silicon oxide ($SiO_x$).

In various embodiments, the first sensor 202 and the third sensor may be arranged in between a pair of magnets (hard bias magnets) along the first direction. The second sensor 204 may be arranged in between another pair of magnets (hard bias magnets) along the first direction.

In the context of various embodiments, the sensor array 200 may further include a first shield layer (e.g. first main shield), and a second shield layer (e.g. second main shield), wherein the first sensor 202 and the second sensor 204 may be arranged in between the first shield layer and the second shield layer. At least one of the first shield layer or the second shield layer may include a soft magnetic material, for example nickel-iron (NiFe).

In the context of various embodiments, the sensor array 200 may be applicable for ultrahigh track density and two-dimensional magnetic recording (TDMR).

Various embodiments may also provide a storage device. The storage device may include a storage medium 280 including a plurality of tracks (e.g. two tracks as represented by 295a, 295b as in FIG. 2A), a sensor array 200 including a first sensor 202, and a second sensor 204, wherein the first sensor 202 and the second sensor 204 are configured to obtain signals from adjacent tracks 295a, 295b of the plurality of tracks of the storage medium 280, the signals being associated with data stored at the adjacent tracks 295a, 295b. Descriptions relating to the sensor array 200 as described above may also be applicable to the sensor array 200 of the storage device.

In various embodiments, the storage device may further include a determination circuit configured to determine data stored in a track of the adjacent tracks 295a, 295b based on the signals obtained by the first sensor 202 and the second sensor 204.

Figure 2B:
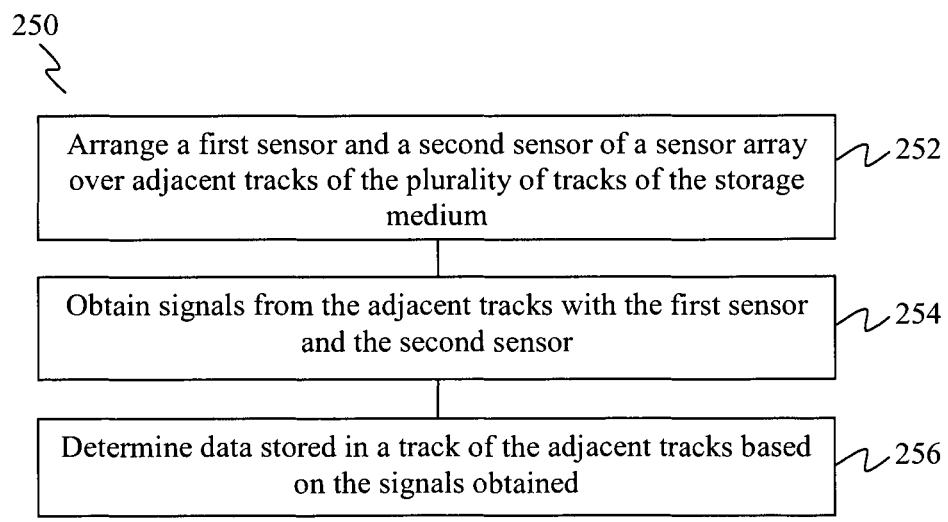
FIG. 2B shows a flow chart illustrating a method of reading data from a storage medium, according to various embodiments.

FIG. 2B shows a flow chart 250 illustrating a method of reading data from a storage medium, according to various embodiments, where the storage medium includes a plurality of tracks.

At 252, a first sensor and a second sensor of a sensor array are arranged over adjacent tracks of the plurality of tracks of the storage medium.

At 254, signals are obtained from the adjacent tracks with the first sensor and the second sensor.

At 256, data stored in a track of the adjacent tracks are determined based on the signals obtained.

Figure 3A:
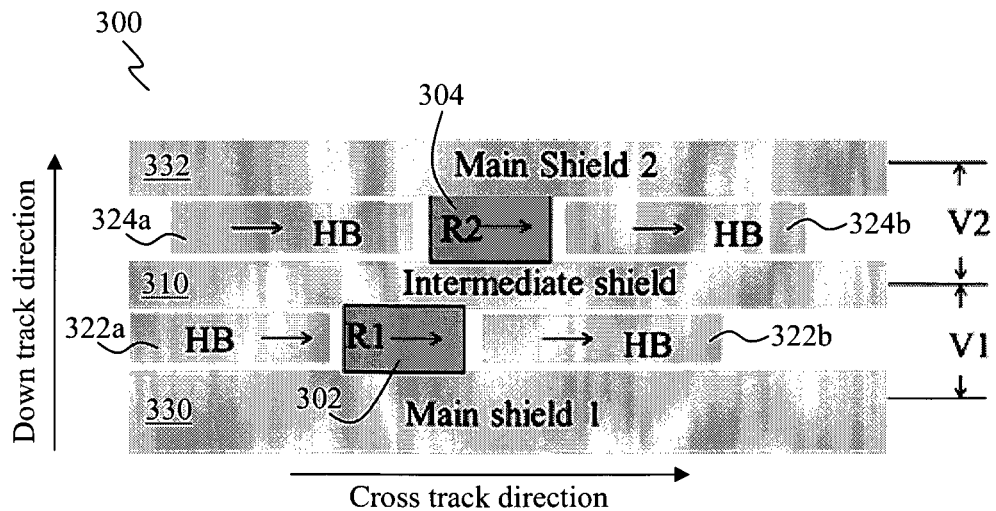
FIG. 3A shows a schematic top view of a sensor array, according to various embodiments.

FIG. 3A shows a schematic top view of a sensor array 300, according to various embodiments. The sensor array (or reader array) 300 may include two sensors or readers (double readers): sensor 1 (or reader 1, R1) 302 and sensor 2 (or reader 2, R2) 304. In order to relieve the requirements in the sensor width for ultrahigh track density, the sensors 302, 304 may be located or arranged side by side or adjacent to each other with at least a partial overlap with each other along the cross track direction and separated from each other by an intermediate shield layer 310 along the down track direction.

As shown in FIG. 3A, the sensors 302, 304 may at least partially overlap with each other, e.g. at least a portion of the sensor 302 may overlap with at least a portion of the sensor 304. This may mean that the sensors 302, 304 may be arranged coaxially along an axis defined along the down track direction. Further, the sensors 302, 304 may be spaced apart from each other in the down track direction, with the intermediate shield layer 310 arranged in between.

As used herein, the "down track direction" may mean a direction along and/or within the track (e.g. data track) of a data storage medium which the sensor array 300 may be arranged relative to.

As used herein, the "cross track direction" may mean a direction that crosses or cuts trough adjacent tracks (e.g. data tracks) of a data storage medium which the sensor array 300 may be arranged relative to.

In various embodiments, the sensor (R1) 302 may be arranged between a pair of hard bias magnets 322a, 322b, while the sensor (R2) 304 may be arranged between a pair of hard bias magnets 324a, 324b. The sensor (R1) 302 and the hard bias (HB) magnets 322a, 322b may be arranged between the intermediate shield layer 310 and a main shield element or layer (main shield 1) 330. The sensor (R2) 304 and the hard bias (HB) magnets 324a, 324b may be arranged between the intermediate shield layer 310 and a main shield element or layer (main shield 2) 332. Therefore, this may mean that the sensor (R1) 302, the sensor (R2) 304, the hard bias (HB) magnets 322a, 322b, 324a, 324b and the intermediate shield layer 310 may be arranged between the pair of main shield layers 330, 332.

Figure 3B:
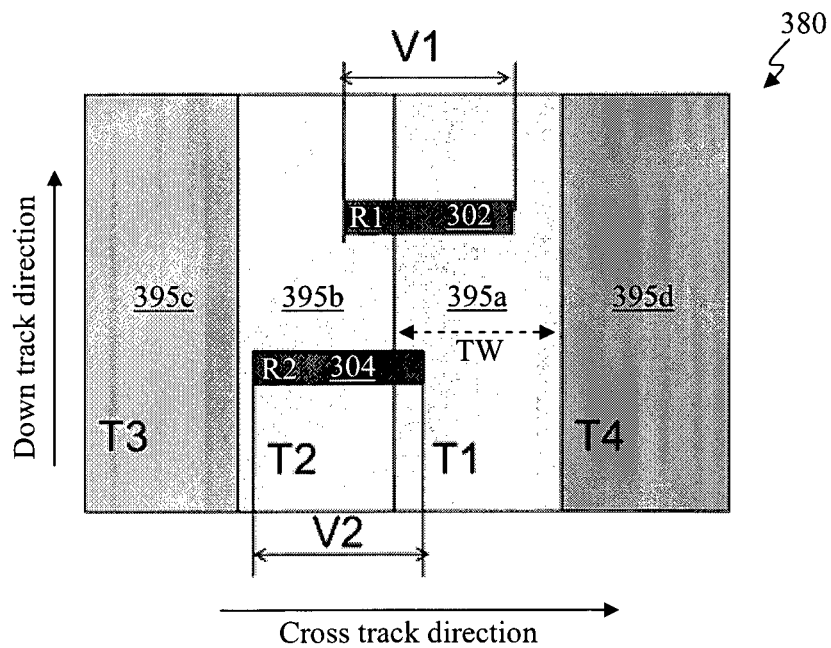
FIG. 3B shows a schematic top view of the sensor array of FIG. 3A relative to tracks of a data storage medium, according to various embodiments.

FIG. 3B shows a schematic top view of the sensor array 300 of FIG. 3A relative to tracks (e.g. data tracks) of a data storage medium 380, according to various embodiments, illustrating the relative locations of the sensors 302, 304 on the targeted tracks, for example Track 1 (T1) 395a and Track 2 (T2) 395b. The sensors 302, 304 may read two adjacent tracks, e.g. T1 395a and T2 395b, in parallel. In other words, data from two adjacent tracks of the data storage medium 380 may be read by the two sensors 302, 304 at least substantially simultaneously. For illustration purposes, four adjacent tracks 395a (T1), 395b (T2), 395c (Track 3; T3), 395d (Track 4; T4) of the data storage medium 380 are shown in FIG. 3B. The parameters "V1" and "V2" in FIGS. 3A and 3B are the same and represent the signal outputs (voltages) of the sensor (R1) 302 and the sensor (R2) 304, respectively. In FIG. 3B, "V1" and "V2" are defined as the respective total voltage of the sensor (R1) 302 and the sensor (R2) 304. Comparing FIGS. 3A and 3B, in FIG. 3A, "V1" and "V2" define the respective voltages between two electrodes (between two shields as shown in FIG. 3A) while in FIG. 3B, "V1" and "V2" define the sensor response region across the track (The two ends do not represent the electrodes for voltage measurements).

As shown in FIGS. 3A and 3B, the sensor width of each sensor 302, 304 may range from less than one track width, for example about 50-70% of the track width (TW), to less than two-track width, for example about 150% of the track width (TW).

Figure 4:
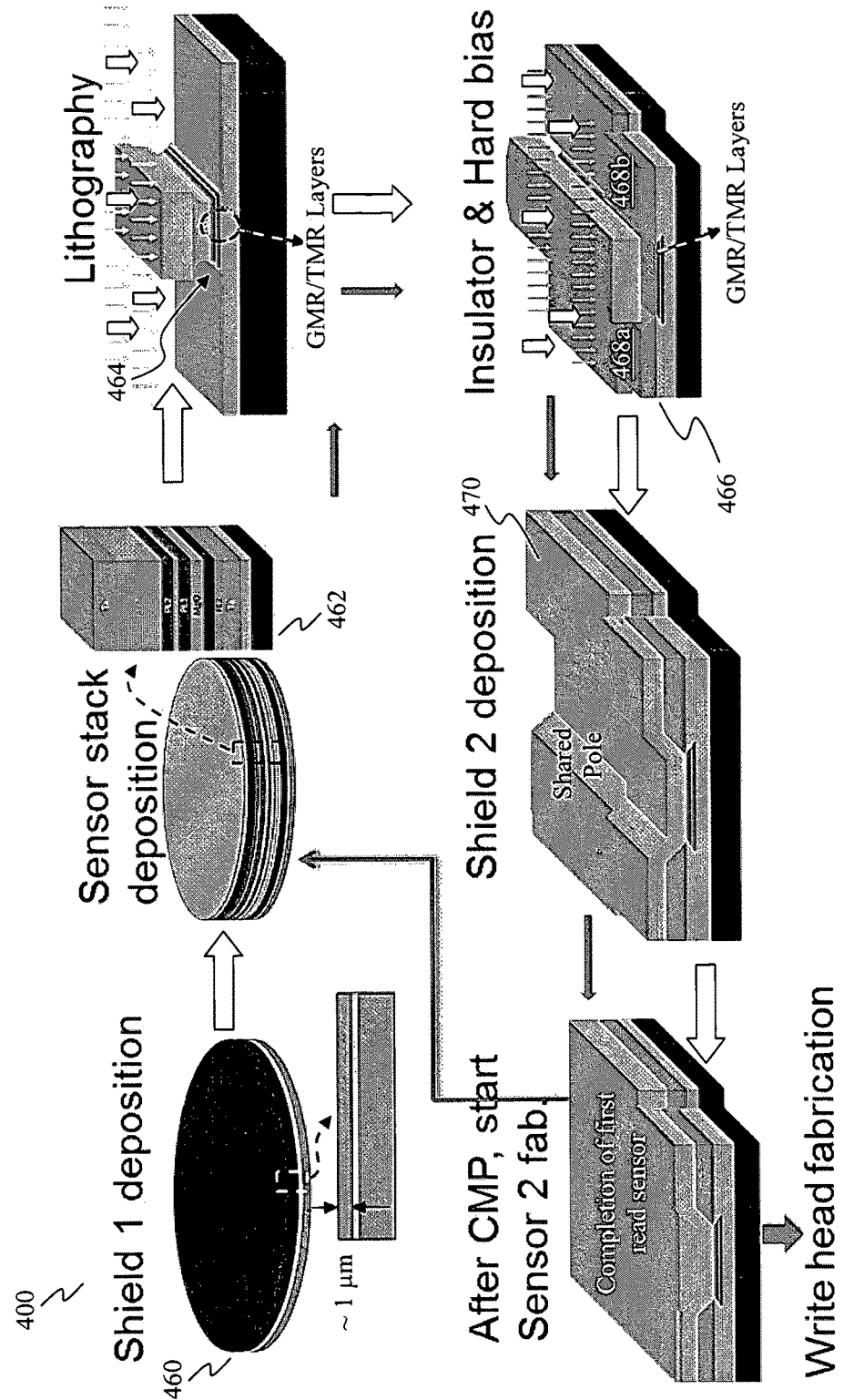
FIG. 4 shows, as perspective views, various processing stages of a method for manufacturing a sensor array, according to various embodiments.

In order to fabricate the sensor array 300, an additional sensor fabrication process may be required as compared to fabrication of a prior art head sensor, for example to fabricate a second sensor. FIG. 4 shows, as perspective views, various processing stages of a method for manufacturing a sensor array, according to various embodiments.

The fabrication may begin with a shield layer fabrication or deposition to form a main shield element 460 (e.g. main shield 1 330, FIG. 3A) made of one or more soft magnetic materials such as nickel-iron (NiFe). The main shield element 460 may then be polished. A sensor multilayer stack 462 for fabrication of a sensor may then be deposited on the polished main shield element 460. As a non-limiting example, the sensor stack 462 may include a plurality of layers, in order starting from the main shield element 460, a tantalum (Ta) layer (thickness ~5 nm), a free layer (FL) arrangement having a first magnetic layer (~3 nm) and a second magnetic layer (~1 nm) arranged over the first magnetic layer, a magnesium oxide (MgO) layer (~2.2 nm), a first pinning layer (PL1) (~2 nm), a ruthenium (Ru) layer (~0.8 nm), a second pinning layer (PL2) (~3 nm), an anti-feromagnetic (AFM) layer (~10 nm), and a tantalum (Ta) layer (~3 nm).

A first sensor or reader 464 (e.g. R1 302, FIG. 3A) may then be fabricated based on the sensor stack 462 by means of lithography and etching processes without a defined stripe height. An insulator layer 466 and hard bias magnets 468a, 468b may then be deposited and fabricated.

Then, an intermediate shield layer 470, made of soft magnetic materials (e.g. NiFe), with a suitable thickness (for example about 10-100 nm, depending on the track width and maximum skew angle) required to shield flux from adjacent bits within the two main shields, may be deposited on top or over the first sensor 464.

After polishing (e.g. by chemical mechanical polishing (CMP)) to get a smooth surface, a second sensor multilayer stack may be deposited on top or over the intermediate shield layer 470. A second sensor or reader (e.g. R2 304, FIG. 3A) may then be fabricated based on the second sensor stack by means of lithography and etching processes. The second sensor and the corresponding hard bias magnets may be fabricated based on the processes described above for fabricating the first sensor 464. Subsequently, another main shield element (e.g. main shield 2 332, FIG. 3A) made of soft magnetic materials such as nickel-iron (NiFe) may be deposited. A write head may then be fabricated.

The two sensors may be positionally separated less than one track width along the cross track direction. The stripe height of the two sensors may be defined in a lapping process after the head fabrication. As the allowed physical width of the sensors in the sensor array may be much larger than that in the prior art single sensor scheme, the lithography and etching process for the sensor fabrication of various embodiments may be much relaxed. Accordingly, the allowed stripe height may also be increased, which may relax the lapping process. Therefore, although the sensor array of various embodiments may need an additional fabrication process in comparison with the prior art single sensor, it may relax the technical challenges in the fabrication process. On the other hand, if the sensor width may be maintained the same as in the single sensor head, a much higher track resolution may be achieved, which may enable ultrahigh track density and two dimensional magnetic recording.

Referring to FIG. 3B, the output signal of each sensor 302, 304 may contain data information from two targeted adjacent tracks (T1 395*a* and T2 395*b*). The respective output signals, V1 corresponding to the sensor (R1) 302 and V2 corresponding to the sensor (R2) 304, may be determined as:

$$V1 = a_1 T1 + b_1 T2 \quad \text{(Equation 1)},$$

$$V2 = a_2 T2 + b_2 T1 \quad \text{(Equation 2)},$$

where $a_1$ and $b_1$ refer to the respective ratios of sensor R1 302 on the tracks T1 395*a* and T2 395*b*, respectively, while $a_2$ and $b_2$ refer to the respective ratios of sensor R2 304 on the tracks T1 395*a* and T2 395*b*, respectively.

In order to obtain the data information ($V_{s1}$ and $V_{s2}$) of the tracks T1 395*a* and T2 395*b*, a data processing may be performed. Considering a linear iteration, $V_{s1}$ and $V_{s2}$ may be determined based on the following:

$$V_{s1} = V1 - c_1 V2 = (a_1 - c_1 \cdot b_2) \cdot T1 \quad \text{(Equation 3)},$$

where $c_1 = b_1 / a_2$, and $$V_{s2} = (a_2 - c_2 \cdot b_1) \cdot T2 \quad \text{(Equation 4)},$$

where $c_2 = b_2 / a_1$.

In various embodiments, $c_1$ and $c_2$ may be selected to provide the highest or optimal SNR for $V_{s1}$ and $V_{s2}$. In this way, pure data information from T1 395*a* and T2 395*b* may be obtained.

In various embodiments, instead of minimising or avoiding inter-track interference (ITI), the sensor array 300 may be used to read two tracks simultaneously. Further, a large SNR may be achieved by signal processing.

In some embodiments, if the two sensors 302, 304 have the same sensor width of two track widths (e.g. 2TW), the parameters $a_1$, $b_1$, $a_2$ and $b_2$ may be such that $a_1 = b_1 = a_2 = b_2$, and no individual track data information may be recovered. In other words, respective data information corresponding to each track may not be obtained. Therefore, in various embodiments, the sensor width should not be too large so as to avoid the exact same reading output of data information by the two sensors 302, 304.

Further, it may be observed from FIG. 3B that the sensors 302, 304 may be located or arranged so as not to read from undesired or unintended tracks (e.g. T3 395*c* and T4 395*d*), which may be done using a servo system with much relaxed accuracy.

There may be challenges faced by the design rule corresponding to the sensor array 300 for large skew angles, which may require reduced sensor width for larger skew angles so as to minimise or avoid reading undesired tracks. For example, for a 2.5" disk or storage medium, the maximum skew angle at the outer and the inner diameters may be about ±15°, respectively.

Figure 5:
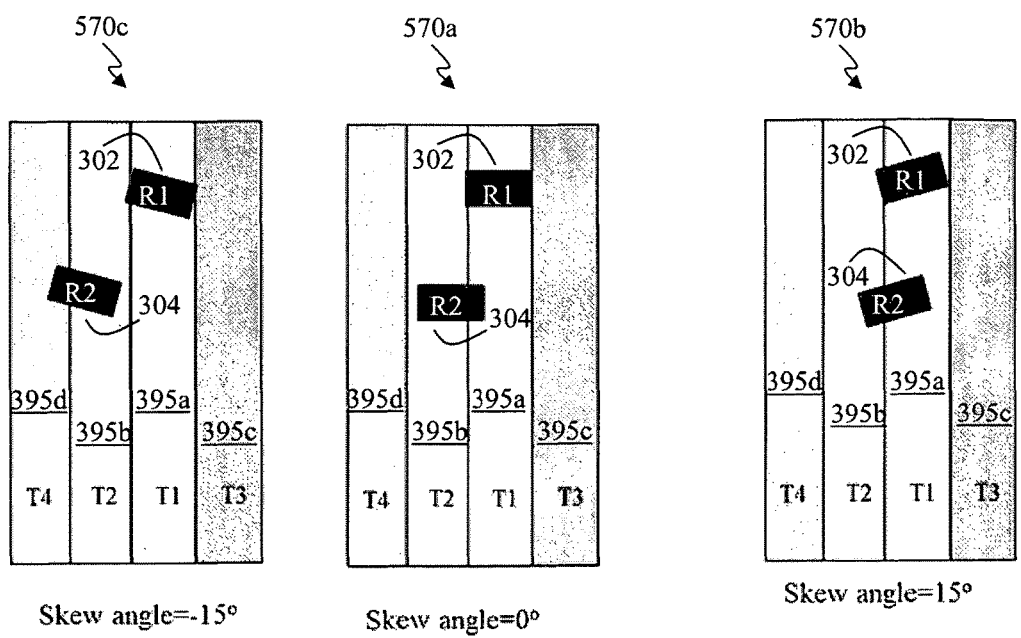
FIG. 5 shows, as schematic top views, the skew angle effect of the sensor array of FIG. 3A.

For illustration and understanding purposes, descriptions relating to the strictest case of the largest skew angle will be provided. FIG. 5 shows, as schematic top views, the skew angle effect of the two-sensor array structure 300. As shown in FIG. 5, for the case 570*a* when the sensors 302, 304 are not skewed relative to the tracks, the two sensors 302, 304 may be positioned to read the targeted two tracks, T1 395*a*, T2 395*b*, simultaneously. Further, for the case 570*b* for a positive skew angle of about 15°, the two sensors 302, 304 may be located to read the two targeted tracks, T1 395*a*, T2 395*b*, simultaneously. However, the signal corresponding to T2 395*b* may be reduced. For the case 570*c* for a skew angle of about −15°, the sensor (R2) 304 may read the track T4 395*d* partially, which may not be eliminated from signal processing using Equations 3 and 4. As may be seen from FIG. 5, the sensor (R2) 304 may, in addition to T2 395*b*, read T4 395*d*, which may be undesired, instead of T1 395*a*, which may be the targeted track to be read. In order to minimise or avoid reading from T4 395*d*, the sensor width of at least one of the sensor (R1) 302 or the sensor (R2) 304 may be reduced, which however may limit the sensor design margins, and reduce the advantages associated with the sensor array 300.

Figure 6A:
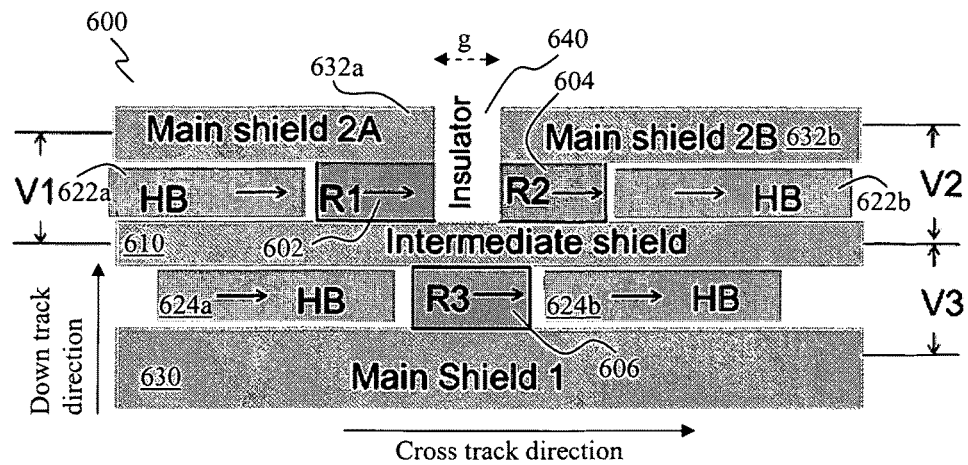
FIG. 6A shows a schematic top view of a sensor array, according to various embodiments.

FIG. 6A shows a schematic top view of a sensor array 600, according to various embodiments. For the sensor array 600 as will be described later, the skew angle effect may be reduced significantly, or at least reduced as compared to the sensor array 300.

The sensor array (or reader array) 600 may include three sensors or readers (triple readers): sensor 1 (or reader 1, R1) 602, sensor 2 (or reader 2, R2) 604, and sensor 3 (or reader 3, R3) 606. The sensors 602, 604, 606 may be located or arranged side by side or adjacent to each other with at least a partial overlap along the cross track direction and separated, along the down track direction, by an intermediate shield layer 610 between the sensors 602, 604 and the sensor 606. As shown in FIG. 6A, two readers 602, 604 may be located side by side, while another reader 606 may be overlaid at least partially with the two readers 602, 604 along the cross track direction and separated by the intermediate shield 610 along the down track direction.

The sensors 602, 604 may overlap with each other along the down track direction. The sensors 602, 604 may be arranged on the same layer. The sensors 602, 604 may at least partially overlap with the sensor 606 along the cross track direction, e.g. at least a portion of the sensor 602 may overlap with at least a portion of the sensor 606, and at least a portion of the sensor 604 may overlap with at least another portion of the sensor 606. This may mean that the sensor 602 may be arranged coaxially with the sensor 606 along an axis defined along the down track direction, while the sensor 604 may be arranged coaxially with the sensor 606 along another axis defined along the down track direction. Further, the sensors 602, 604 may be spaced apart or separated from the sensor 606 with the intermediate shield layer 610 arranged in between.

The sensor (R1) 602 and the sensor (R2) 604 may be separated or spaced apart from each other, for example by a small insulating structure or element (e.g. gap or insulating material) 640 which may prevent or at least minimise electrical shorting between the sensors 602, 604. The insulating structure 640 should be large enough to minimise or avoid the magnetic interference of the two sensors (R1 and R2) 602, 604 and small enough to provide a sufficient hard bias field. The insulating structure 640 may be or may include an air gap or an insulating material (or insulator), e.g. aluminum oxide ($Al_2O_3$) or silicon oxide ($SiO_x$). The gap length, g, of the insulating structure 640 may range from about 10 nm to one track width (TW).

The sensors 602, 604 may be distributed or arranged on two sides of the sensor 606 at least substantially symmetrically with at least a partial overlap on each side of the sensor 606. The insulating structure 640 may be arranged coaxially with the sensor 606, for example located at the center of the sensor 606. However, it should be appreciated that the insulating structure 640 may be arranged offset from the central axis of the sensor 606.

In various embodiments, the sensor (R1) 602 and the sensor (R2) 604 may be arranged between a pair of hard bias magnets 622a, 622b, while the sensor (R3) 606 may be arranged between a pair of hard bias magnets 624a, 624b. The sensor (R1) 602 and the hard bias (HB) magnet 622a may be arranged between the intermediate shield layer 610 and a main shield element or layer (main shield 2A) 632a, while the sensor (R2) 604 and the hard bias (HB) magnet 622b may be arranged between the intermediate shield layer 610 and a main shield element or layer (main shield 2B) 632b. The main shield 2A 632a and the main shield 2B 632b may be part of a common main shield layer. The sensor (R3) 606 and the hard bias (HB) magnets 624a, 624b may be arranged between the intermediate shield layer 610 and a main shield element or layer (main shield 1) 630. Therefore, this may mean that the sensor (R1) 602, the sensor (R2) 604, the sensor (R3) 606, the hard bias (HB) magnets 622a, 622b, 624a, 624b and the intermediate shield layer 610 may be arranged between the main shield layers 630, 632a, 632b.

In various embodiments, the sensor array 600 may read three tracks in parallel at small skew angles and may read two tracks in parallel at large skew angles.

The fabrication process for manufacturing the sensor array 600 may be similar to or based on the fabrication process described above in the context of FIG. 4. For example, some of the procedures may include depositing a sensor multilayer stack onto a polished main shield (e.g. main shield 1 630, FIG. 6A) made of soft magnetic materials such as NiFe, and a sensor or reader (e.g. R3 606, FIG. 6A) may then be fabricated based on the sensor stack by means of lithography and etching processes without a defined stripe height.

An intermediate shield layer (e.g. 610, FIG. 6A), made of soft magnetic materials (e.g. NiFe), with a suitable thickness (for example about 10-100 nm, depending on the track width and maximum skew angle) required to shield magnetic flux from adjacent bits within the two main shields, may be deposited on top or over the fabricated sensor.

After polishing (e.g. by chemical mechanical polishing (CMP)) to get a smooth surface, a second sensor multilayer stack for fabricating sensors (e.g. R1 602 and R2 604, FIG. 6A) may be deposited on top or over the intermediate shield layer. The sensors or readers (e.g. R1 602 and R2 604, FIG. 6A) may then be fabricated based on the second sensor stack by means of lithography and etching processes as a single or common sensor having a width of two sensor widths plus a distance equivalent to the gap length, g (see FIG. 6A). The central axis of the common sensor, for defining the sensors R1 602 and R2 604, may be at least substantially coincident with the central axis of the earlier sensor fabricated (e.g. R3 606, FIG. 6A). After deposition of a second main shield element, an insulating structure (e.g. 640, FIG. 6A) may be formed by lithography, etching and deposition process. As a result, the common sensor may be defined into two sensors R1 602 and R2 604, and the second main shield element may be defined into main shield layers 632a, 632b. The insulating structure may be aligned with the sensor R3 606 so that their central axes may be coincident with each other and its width, g, may be less than one track width along the cross track direction.

The stripe height of the three sensors may be defined in a lapping process after the head fabrication. As the allowed physical width of the sensors in the sensor array may be much larger than that in the prior art single sensor scheme, the lithography and etching process for the sensor fabrication of various embodiments may be much relaxed. Accordingly, the allowed stripe height may also be increased, which may relax the lapping process. Therefore, although the sensor array of various embodiments may need an additional fabrication process in comparison with the prior art single sensor, it may relax the technical challenges in the fabrication process. On the other hand, if the sensor width may be maintained the same as in the single sensor head, a much higher track resolution may be achieved, which may enable ultrahigh track density and two dimensional magnetic recording. Nevertheless, as compared to the fabrication of the sensor array 300, there may be challenges in the fabrication of the insulating structure due to the large aspect involved, as will be described later below.

Figure 6B:
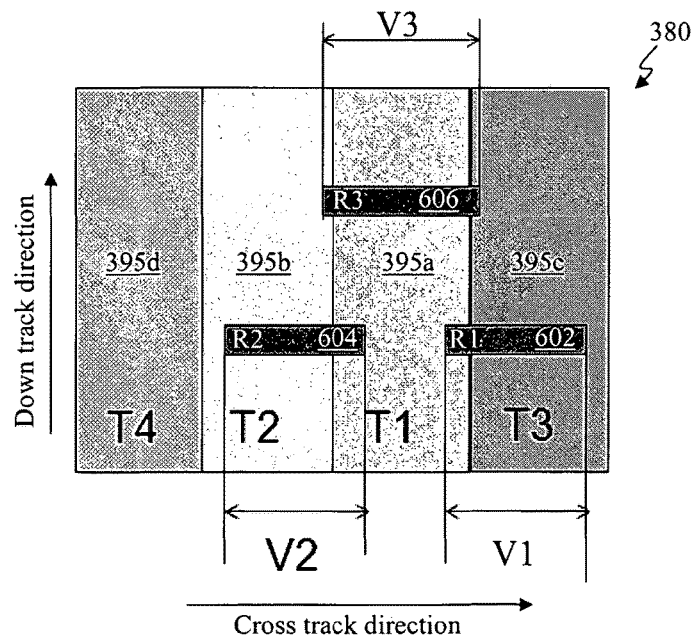
FIG. 6B shows a schematic top view of the sensor array of FIG. 6A relative to tracks of a data storage medium, according to various embodiments.

FIG. 6B shows a schematic top view of the sensor array 600 of FIG. 6A relative to tracks (e.g. data tracks) of a data storage medium 380, according to various embodiments, illustrating the relative locations of the sensors 602, 604, 606 on the targeted tracks, for example Track 1 (T1) 395a, Track 2 (T2) 395b and Track 3 (T3) 395c. For illustration purposes, four adjacent tracks 395a (T1), 395b (T2), 395c (Track 3; T3), 395d (Track 4; T4) of the data storage medium 380 are shown in FIG. 6B. The parameters "V1", "V2" and "V3" in FIGS. 6A and 6B are the same and represent the signal outputs (voltages) of the sensor (R1) 602, the sensor (R2) 604 and the sensor (R3) 606, respectively. In FIG. 6B, "V1", "V2" and "V3" are defined as the respective total voltage of the sensor (R1) 602, the sensor (R2) 604 and the sensor (R3) 606. Comparing FIGS. 6A and 6B, in FIG. 6A, "V1", "V2" and "V3" define the respective voltages between two electrodes (between two shields as shown in FIG. 6A) while in FIG. 6B, "V1", "V2" and "V3" define the sensor response region across the track (the two ends do not represent the electrodes for voltage measurements).

Each sensor 602, 604, 606 may read two adjacent tracks in parallel. The sensors 602, 604, 606, in combination, may read three adjacent tracks in parallel. In other words, data from three adjacent tracks of the data storage medium 380 may be read by the three sensors 602, 604, 606 at least substantially simultaneously. Further, as a non-limiting example, the sensor (R3) 606 may read from three tracks, e.g. Track 1 (T1) 395a, Track 2 (T2) 395b and Track 3 (T3) 395c.

Referring to FIG. 6B, the signal output of each individual track may be determined as described below. The respective output signals, V3 corresponding to the sensor (R3) 606, V2 corresponding to the sensor (R2) 604, and V1 corresponding to the sensor (R1) 602, may be determined as:

$$V3 = a_1 T1 + b_1 T2 + c_1 T3 \quad \text{(Equation 5)},$$

$$V2 = a_2 T2 + b_2 T1 \quad \text{(Equation 6)},$$

$$V1 = a_3 T3 + b_3 T1 \quad \text{(Equation 7)}.$$

The data information ($V_{s1}$, $V_{s2}$ and $V_{s3}$) of the tracks T1 395a, T2 395b and T3 395c may be determined based on the following:

$$V_{s1} = V3 - d_1 V2 - e_1 V1 = (a_1 - d_1 \cdot b_2 - e_1 \cdot b_3) \cdot T1 \quad \text{(Equation 8)}$$

where $d_1 = b_1/a_2$, and $e_1 = c_1/b_3$, and $$V_{s2} = (a_2 - d_2 \cdot b_1) \cdot T2 \quad \text{(Equation 9)},$$

where $d_2 = b_2/a_1$, and $$V_{s3} = (a_3 - e_3 c_1) \cdot T3 \quad \text{(Equation 10),}$$

where $e_3 = b_3/a_1$.

In Equations 6 and 7, the second order small term from T3 395c and T2 395b, respectively may be omitted for discussion purposes. Nevertheless, they may be strictly solved through Equations 5, 6 and 7.

In various embodiments, the three sensors 602, 604, 606 may read three tracks in parallel. Further, using the sensor array 600, a high track resolution and/or a large SNR may be achieved. Further, the symmetrical reader array 600 may reduce the skew angle effect.

Figure 7A:
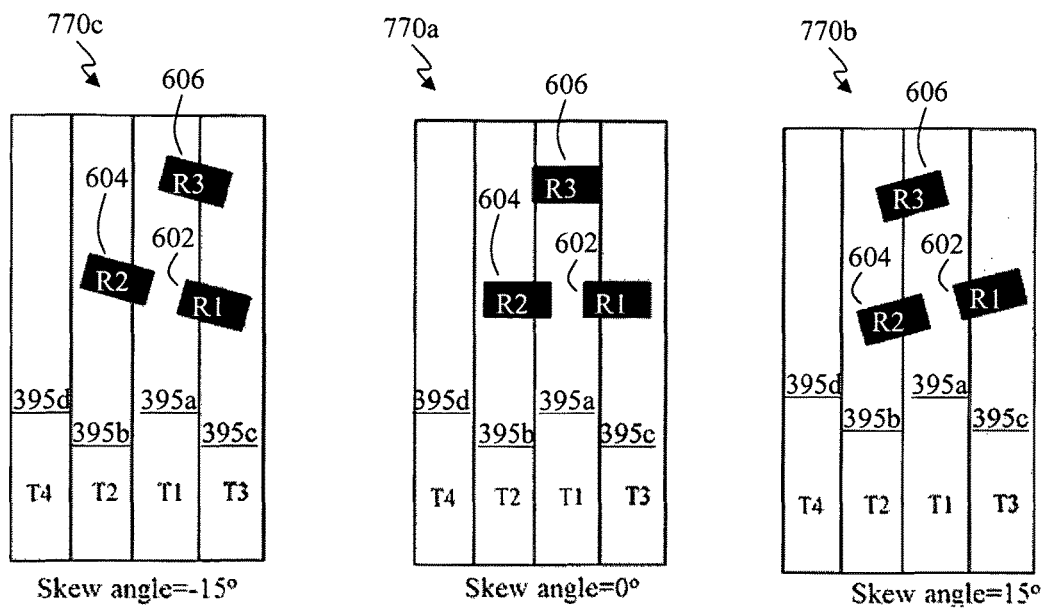
FIG. 7A shows, as schematic top views, the skew angle effect of the sensor array of FIG. 6A.

FIG. 7A shows, as schematic top views, the skew angle effect of the sensor array 600 of FIG. 6A, illustrating how the three-sensor array structure 600 may minimise or avoid the skew angle effect. For the cases 770a, 770b, 770c, the three sensors 602, 604, 606 may be positioned to read the targeted three tracks, T1 395a, T2 395b, T3 395c, simultaneously. As may be observed, the skew angle effect may be relieved. For both negative and positive skew angles of about ±15°, the sensors (R1) 602, (R2) 604 and (R3) 606 may be located or arranged within the targeted tracks, T1 395a, T2 395b, T3 395c. This may allow the three sensors 602, 604, 606 to read three tracks simultaneously.

Figure 7B:
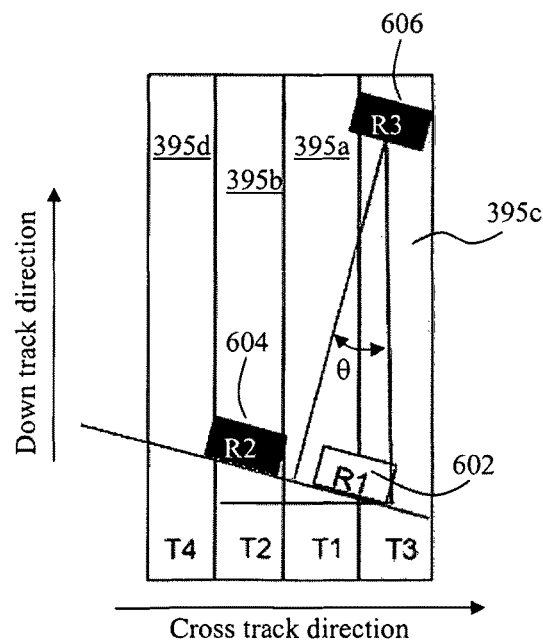
FIG. 7B shows a schematic view illustrating the geometric relationship of three sensors for the estimation of skew angle induced shifting of the sensor relative positions.

The skew angle induced shift of the sensor relative positions from its desired location at zero skew angle may be dependent on the thickness of the intermediate layer and the sensor stack. FIG. 7B shows a schematic view illustrating the geometric relationship of the three sensors 602, 604, 606, for the estimation of skew angle induced shifting of the sensor relative positions, i.e. the estimated shift of the sensor relative positions due to skew angle. In various embodiments, the shift should be less than one track width along the cross track direction. The shift (S), due to skew angle ($\theta$), may be estimated based a simple geometry as shown in FIG. 7B using the following:

$$S = 2*(t+sss)*\sin(\theta/2)*\cos(\theta/2) \quad \text{(Equation 11),}$$

where t is the thickness of the intermediate layer (e.g. 610, FIG. 6A), "sss" is the shield to shield spacing (e.g. "sss" may be about 20 nm) which is in turn may be determined by the thickness of the sensor stack (e.g. "sss" may refer to the distance from an intermediate shield (e.g. 610, FIG. 6A) to a main shield element (e.g. 630, FIG. 6A)), and $\theta$ is the skew angle. The track pitch ($T_p$) may be about 32 nm. The term "track pitch" refers to the distance between adjacent two tracks from center to center. A track width (TW) refers to the width of one track, which does not include an erasure band. Without the erasure band, the track pitch and the track width may be the same.

Figure 8:
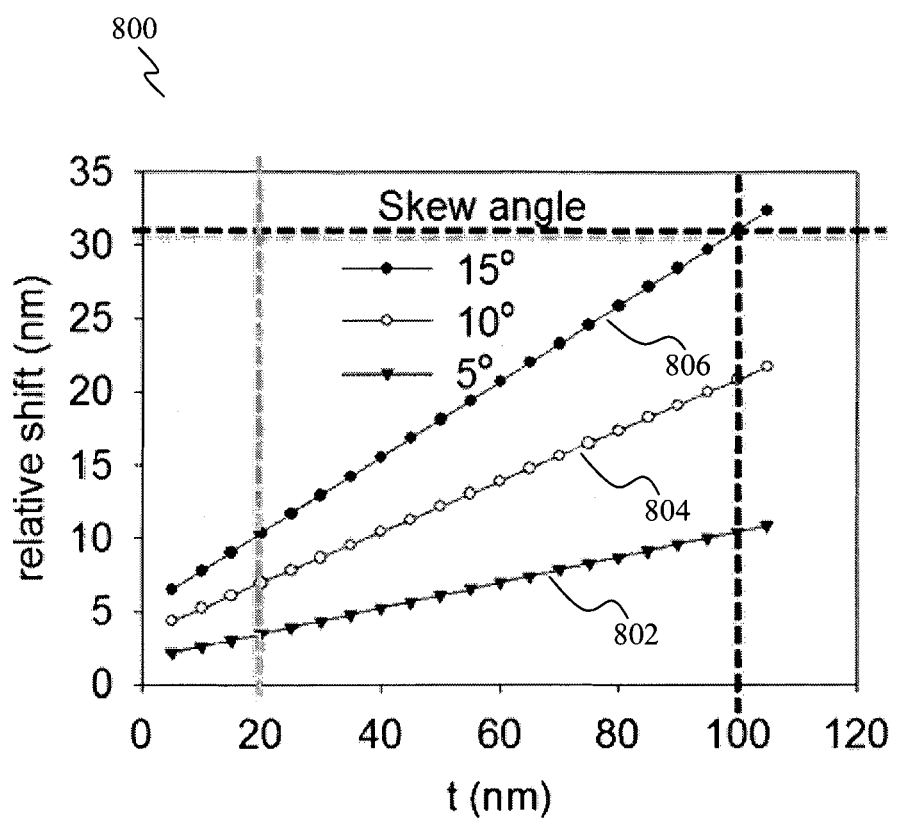
FIG. 8 shows a plot of the relative shift of sensor position at different skew angles for a shield to shield spacing (sss) of about 20 nm.

FIG. 8 shows a plot 800 of the relative shift of sensor position at different skew angles for "sss"=20 nm, illustrating an example of the relative shift of the sensor position along the cross track direction. Plot 800 shows results 802 for a skew angle of about 5°, results 804 for a skew angle of about 10°, and results 806 for a skew angle of about 15°. For a track pitch ($T_p$) of about 32 nm, the maximum allowed thickness, t, of the intermediate layer may be about 100 nm so as to minimise or prevent the sensor R2 604 from reading the undesired track (T4) 395d. In order to avoid reading the undesired track, the shift (S) should be less than one track pitch, for a track pitch ($T_p$)=32 nm, and t≤100 nm at skew angles of ±15°.

Using an intermediate layer of a thickness, t, of about 20 nm, the sensor array structure (e.g. 600) may work for a track pitch down to about 10 nm for skew angles of ±15°, based on the relative shift of about 10 nm for t=10 nm and a skew angle of about 15°. Therefore, this sensor array may be robust against the skew angle effect.

However, there may be challenges related to the sensor array 600 in the complexity of the fabrication process and the sensor stability for the sensors R1 602 and R2 604. As shown in FIG. 6A, the sensors R1 602 and R2 604 are separated by an insulating structure 640 with a width less than one track width. As the main shield 2A 632a and the main shield 2B 632b are relatively thick, for example about 1 μm, the process to fabricate the insulating structure 640 may be related to an aspect ratio of over 30, even for a 30-nm track width design. For a track width of about 10 nm, the related aspect ratio may be larger than 100, resulting in challenges in the fabrication process. In addition, as the hard bias 622a, 622b for the sensors R1 602 and R2 604 may be separated by the two sensors 602, 604, and the insulating structure 640, there may be challenges in sensor biasing.

For the sensor array 600, the fabrication process may apply a large aspect ratio (AR) (e.g. AR~50) process due to a small gap or spacing between the sensors 602, 604. Further, there may be sensor instability due to weak pinning for the sensors 602, 604 with a large separation. In some embodiments, the sensor width may be limited to $(3T_p-g)/2$, where $T_p$ is the track pitch, and g is the gap or spacing between the sensors 602, 604.

Figure 9A:
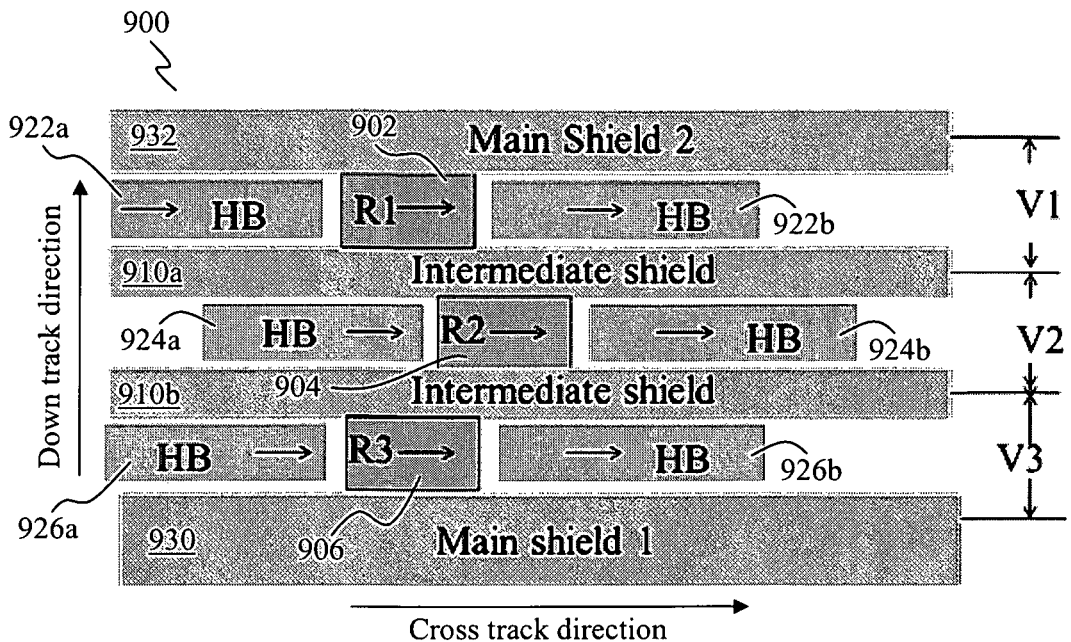
FIG. 9A shows a schematic top view of a sensor array, according to various embodiments.

FIG. 9A shows a schematic top view of a sensor array 900, according to various embodiments, which may address challenges or issues related to the fabrication process and sensor stability, while being robust against the skew angle effect.

The sensor array (or reader array) 900 may include three sensors or readers (triple readers): sensor 1 (or reader 1, R1) 902, sensor 2 (or reader 2, R2) 904, and sensor 3 (or reader 3, R3) 906. The sensors 902, 904, 906 may be distributed or arranged along the down track direction. The sensors 902, 904, 906 may be at least partially overlapped with each other along the cross-track direction and may be separated by a respective intermediate shield 910a, 910b between two adjacent sensors along the down track direction. As shown in FIG. 9A, the three readers 902, 904, 906 may be arranged along the down track direction with a symmetrical axis along the cross track direction.

The three readers 902, 904, 906 may be located side by side or adjacent to each other, with the sensors 902, 904 separated by the intermediate shield layer 910a along the down track direction, and the sensors 904, 906 separated by the intermediate shield layer 910b along the down track direction. As may be observed in FIG. 9A, the sensors 902, 906 may be at least partially overlapped with the sensor 904. In other words, at least a portion of the sensor 904 may overlap with at least a respective portion of the sensors 902, 906. The sensors 902, 906 may be completely (or fully) overlapped with each other in the cross track direction. The sensors 902, 906 may be separated by the sensor 904 and the two intermediate shield layers 910a, 910b. The sensor 902 may be located or arranged close to a main shield element or layer (main shield 2) 932, while the sensor 906 may be located or arranged close to another main shield element or layer (main shield 1) 930.

In various embodiments, each sensor 902, 904, 906 has its associated hard bias, and therefore there may not be any related process and biasing issues. For example, the sensor (R1) 902 may be arranged between a pair of hard bias (HB) magnets 922a, 922b, the sensor (R2) 904 may be arranged between a pair of hard bias (HB) magnets 924a, 924b, while the sensor (R3) 906 may be arranged between a pair of hard bias (HB) magnets 926a, 926b.

The sensor (R1) 902 and the hard bias (HB) magnets 922a, 922b may be arranged between the intermediate shield layer 910a and the main shield 2 932. The sensor (R2) 904 and the hard bias (HB) magnets 924a, 924b may be arranged between the intermediate shield layers 910a, 910b. The sensor (R3) 906 and the hard bias (HB) magnets 926a, 926b may be arranged between the intermediate shield layer 910b and the main shield 1 930. Therefore, this may mean that the sensor (R1) 902, the sensor (R2) 904, the sensor (R3) 906, the hard bias (HB) magnets 922a, 922b, 924a, 924b, 926a, 926b and the intermediate shield layers 910a, 910b may be arranged between the pair of main shield layers 930, 932.

In various embodiments, the sensor array 900 may read two tracks (e.g. data tracks) in parallel.

The fabrication process for manufacturing the sensor array 900 may be similar to or based on the fabrication process described above in the context of FIG. 4 and/or in the context of the fabrication process for the sensor array 600. For example, some of the procedures may include depositing a sensor multilayer stack onto a polished main shield (e.g. main shield 1 930, FIG. 9A) made of soft magnetic materials such as NiFe, and a sensor or reader (e.g. R3 906, FIG. 9A) may then be fabricated based on the sensor stack by means of lithography and etching processes without a defined stripe height.

An intermediate shield layer (e.g. 910b, FIG. 9A), made of soft magnetic materials (e.g. NiFe), with a suitable thickness (for example about 10-100 nm, depending on the track width and maximum skew angle) required to shield magnetic flux from adjacent bits within the two main shields, may be deposited on top or over the fabricated sensor.

After polishing (e.g. by chemical mechanical polishing (CMP)) to get a smooth surface, a second sensor multilayer stack for fabricating another sensor or reader (e.g. R2 904, FIG. 9A) may be deposited on top or over the intermediate shield layer. A sensor (e.g. R2 904) may then be fabricated based on the second sensor stack by means of lithography and etching processes. Another intermediate shield layer (e.g. 910a, FIG. 9A), e.g. made of soft magnetic materials (e.g. NiFe), with a suitable thickness (for example about 10-100 nm, depending on the track width and maximum skew angle), may be deposited on top or over the fabricated second sensor.

After polishing (e.g. by chemical mechanical polishing (CMP)) the second intermediate shield layer, a third sensor multilayer stack for fabricating another sensor or reader (e.g. R1 902, FIG. 9A) may be deposited on top or over the second intermediate shield layer. A sensor (e.g. R1 902) may then be fabricated based on the third sensor stack by means of lithography and etching processes.

The central axis of the sensors 902, 906 along the down track direction and the sizes of the sensors 902, 906 may be at least substantially similar or the same.

The stripe height of the three sensors may be defined in a lapping process after the head fabrication. As the allowed physical width of the sensors in the sensor array may be much larger than that in the prior art single sensor scheme, the lithography and etching process for the sensor fabrication of various embodiments may be much relaxed. Accordingly, the allowed stripe height may also be increased, which may relax the lapping process. Therefore, although the sensor array of various embodiments may need an additional fabrication process in comparison with the prior art single sensor, it may relax the technical challenges in the fabrication process. On the other hand, if the sensor width may be maintained the same as in the single sensor head, a much higher track resolution may be achieved, which may enable ultrahigh track density and two dimensional magnetic recording.

In comparison to the fabrication process for the sensor array 300, an additional process may be required to fabricate a third sensor and an additional second intermediate shield for the sensor array 900. However, the sensor array structure 900 may be robust against large skew angles. In comparison to the fabrication process for the sensor array 600, the fabrication process for the sensor array 900 may avoid the fabrication of a small insulating structure, making the process less technical challenging and overcoming (or at least minimising) the sensor instability issues.

Figure 9B:
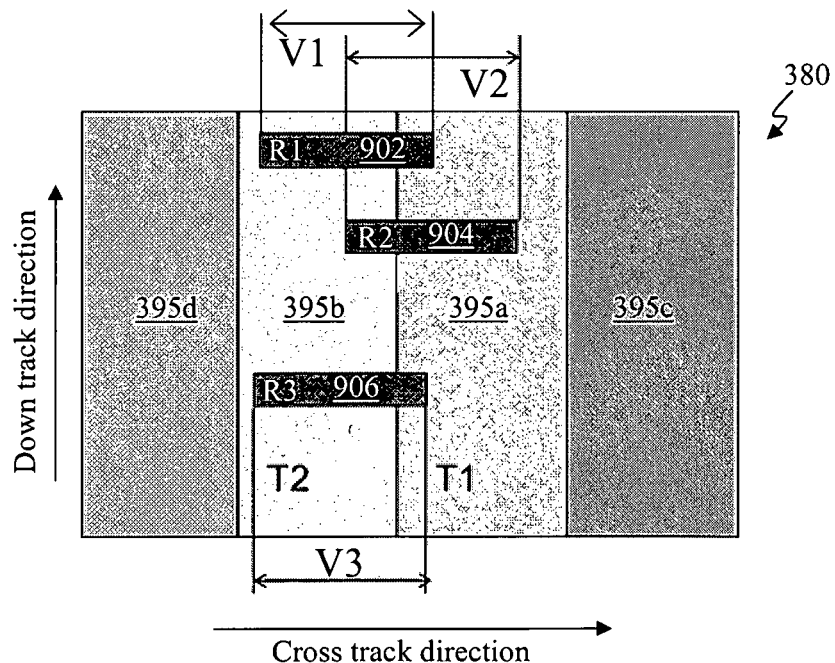
FIG. 9B shows a schematic top view of the sensor array of FIG. 9A relative to tracks of a data storage medium, according to various embodiments.

FIG. 9B shows a schematic top view of the sensor array 900 of FIG. 9A relative to tracks (e.g. data tracks) of a data storage medium 380, according to various embodiments, illustrating the relative locations of the sensors 902, 904, 906 on the targeted tracks, for example Track 1 (T1) 395a, and Track 2 (T2) 395b. Each sensor 902, 904, 906 may read two adjacent tracks in parallel. For illustration purposes, four adjacent tracks 395a (T1), 395b (T2), 395c (Track 3; T3), 395d (Track 4; T4) of the data storage medium 380 are shown in FIG. 9B. The parameters "V1", "V2" and "V3" in FIGS. 9A and 9B are the same and represent the signal outputs (voltages) of the sensor (R1) 902, the sensor (R2) 904 and the sensor (R3) 906, respectively. In FIG. 9B, "V1", "V2" and "V3" are defined as the respective total voltage of the sensor (R1) 902, the sensor (R2) 904 and the sensor (R3) 906. Comparing FIGS. 9A and 9B, in FIG. 9A, "V1", "V2" and "V3" define the respective voltages between two electrodes (between two shields as shown in FIG. 9A) while in FIG. 9B, "V1", "V2" and "V3" define the sensor response region across the track (the two ends do not represent the electrodes for voltage measurements).

The signal output of each individual track may be determined as described below. The respective output signals, V1 corresponding to the sensor (R1) 902, and V2 corresponding to the sensor (R2) 904, may be determined as:

$$V2 = a_1 T1 + b_1 T2 \quad \text{(Equation 12)},$$

$$V1 = a_2 T2 + b_2 T1 \quad \text{(Equation 13)},$$

The data information ($V_{s1}$ and $V_{s2}$) of the tracks T1 395a and T2 395b may be determined based on the following:

$$V_{s1} = V2 - c_1 V1 = (a_1 - c_1 \cdot b) \cdot T1 \quad \text{(Equation 14)},$$

where $c_1 = b_1/a_2$, and $$V_{s2} = (a_2 - c_2 \cdot b_1) \cdot T2 \quad \text{(Equation 15)},$$

where $c_2 = b_2/a_1$.

In various embodiments, $c_1$ and $c_2$ may be selected to provide the highest or optimal SNR.

It should be appreciated that V1 may be related to any one of the sensors (R1) 902 or (R3) 906, and/or may be from an average of the two sensors 902, 906 at zero skew angle. In other words, V1 and V3 may be equivalent to each other. In comparison to the sensor array 300, the third sensor (R3) 906 may be provided for avoiding or minimising the skew angle effect.

In various embodiments, the three sensors 902, 904, 906 may read two tracks in parallel. The sensors 902, 906 may read one track (e.g. T2 395b) simultaneously, thereby increasing SNR. In various embodiments, a high SNR for T1 395a and T2 395b may be further achieved by signal processing the signals V1 and V2.

Figure 10:
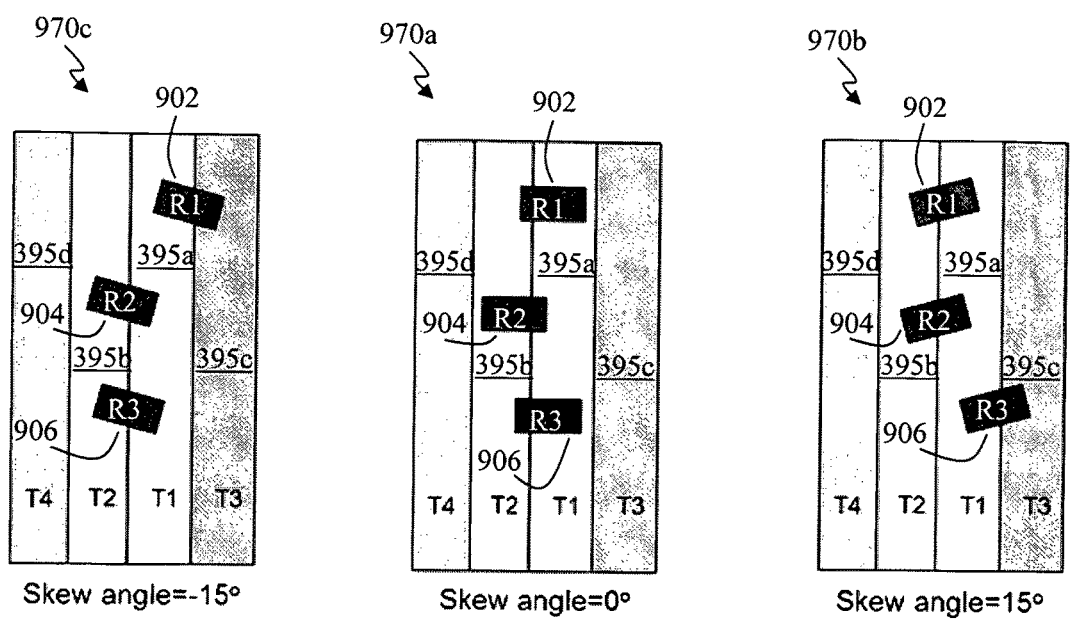
FIG. 10 shows, as schematic top views, the skew angle effect of the sensor array of FIG. 9A.

FIG. 10 shows, as schematic top views, the skew angle effect of the sensor array 900 of FIG. 9A, illustrating how the three-sensor array structure 900 may minimise 20, or avoid the skew angle effect. For the case 970*a* when the sensors 902, 904, 906 are not skewed relative to the tracks, the sensor (R2) 904 and at least one of the sensor (R1) 902 or the sensor (R3) 906 may be positioned to read the two targeted tracks, T1 395*a*, T2 395*b*, simultaneously. For the case 970*b* for a positive skew angle of about 15°, the sensors 902, 904 may be used to read the targeted tracks (T1 395*a* and T2 395*b*), while the sensor 906 may be deactivated. For the case 970*c* for a skew angle of about −15°, the the sensors 904, 906 may be used to read the targeted tracks (T1 395*a* and T2 395*b*), while the sensor 902 may be deactivated. Therefore, for both positive and negative skew angles, two tracks may be read simultaneously.

In comparison to the sensor arrays 300, 600, the sensor array 900 may have advantages in terms of sensor stability, fabrication process and less skew angle effect. For example, the sensor array 900 may have no sensor stability and high AR process issues. Also, a larger sensor width may be provided for the sensor array 900.

In various embodiments, the estimation of skew angle induced shifting of the sensor relative positions, e.g. using Equation 11, and the results and descriptions in the context of FIG. 8 as described above in relation to the sensor array 600 may also be applicable to the sensor array 900.

Various embodiments may provide one or more of the following features as compared to prior art: (1) increase in the physical width of reader sensor, with more than 10% of track resolution and/or allowing a large sensor width (e.g. up to 150%) of track width; (2) a fabrication process with relaxed feature size control, and/or relaxed lapping process control, and/or additional processes, which may double the reader fabrication processes; (3) a higher track resolution, e.g. more than 10% increment of track resolution; (4) increase in the reading speed, where two tracks may be read simultaneously; or (5) additional signal processing may be applied.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A sensor array for reading data from a storage medium comprising a plurality of tracks, the sensor array comprising:
    a first sensor;
    a second sensor; and
    a third sensor,
    wherein the first sensor, the second sensor, and the third sensor are configured to obtain signals from adjacent tracks of the plurality of tracks of the storage medium, the signals being associated with data stored at the adjacent tracks;
    wherein the first sensor, the second sensor, and the third sensor are arranged coaxially along a second direction;
    wherein the second sensor is arranged between the first sensor and the third sensor along the second direction;
    wherein the second sensor partially overlaps each of the first sensor and the third sensor along a first direction;
    wherein the first sensor, the second sensor, and the third sensor are spaced apart from each other along the second direction;
    wherein the first direction extends perpendicular to the plurality of tracks; and
    wherein the second direction extends perpendicular to the first direction,
    wherein the sensor array includes only the first, second, and third sensors.

2. The sensor array as claimed in claim 1, wherein at least one of the first sensor or the second sensor is dimensioned to have a width that is larger than a width of one track of the adjacent tracks.

3. The sensor array as claimed in claim 1, wherein at least one of the first sensor or the second sensor is dimensioned to have a width that ranges from less than a width of one track of the adjacent tracks to less than a total width of the adjacent tracks.

4. The sensor array as claimed in claim 1, wherein the first sensor and the third sensor completely overlap each other along the first direction.

5. The sensor array as claimed in claim 1, wherein each of the first sensor and the third sensor is configured to obtain signals from same two tracks of the adjacent tracks.

6. The sensor array as claimed in claim 1, wherein the first sensor, the second sensor, and the third sensor are configured to obtain the signals from three adjacent tracks.

7. The sensor array as claimed in claim 1, further comprising a data determination circuit configured to determine data stored in a track of the adjacent tracks based on the signals obtained by the first sensor, the second sensor, and the third sensor.

8. The sensor array as claimed in claim 1, wherein the first sensor, the second sensor, and the third sensor are configured to read two tracks in parallel; and wherein the first sensor and the third sensor are configured to simultaneously read one track of the two tracks.

* * * * *